United States Patent
Hamazaki et al.

(10) Patent No.: US 10,017,652 B2
(45) Date of Patent: Jul. 10, 2018

(54) ADDITIVE FOR AQUEOUS COATING MATERIAL FOR IMPARTING DISTINCTNESS OF IMAGE TO COATING FILM

(71) Applicant: KUSUMOTO CHEMICALS, LTD., Tokyo (JP)

(72) Inventors: Chihiro Hamazaki, Saitama-ken (JP); Katsura Naganuma, Saitama-ken (JP); Shigehiro Kawahito, Saitama-ken (JP)

(73) Assignee: KUSUMOTO CHEMICALS, LTD., Tokyo (JP)

(*) Notice: Subject to any disclaimer, the term of this patent is extended or adjusted under 35 U.S.C. 154(b) by 15 days.

(21) Appl. No.: 15/198,141

(22) Filed: Jun. 30, 2016

(65) Prior Publication Data
US 2017/0051162 A1 Feb. 23, 2017

(30) Foreign Application Priority Data
Aug. 18, 2015 (JP) ................. 2015-160839

(51) Int. Cl.
| | | |
|---|---|---|
| *C09D 5/00* | (2006.01) | |
| *C09D 7/12* | (2006.01) | |
| *C08K 5/16* | (2006.01) | |
| *C09B 69/00* | (2006.01) | |
| *C09D 7/00* | (2018.01) | |
| *C09D 17/00* | (2006.01) | |
| *C09B 69/10* | (2006.01) | |
| *C09D 7/41* | (2018.01) | |

(52) U.S. Cl.
CPC .............. *C09D 7/007* (2013.01); *C09B 69/10* (2013.01); *C09D 5/00* (2013.01); *C09D 7/41* (2018.01); *C09D 17/00* (2013.01)

(58) Field of Classification Search
USPC ................ 106/31.53; 527/200, 202
See application file for complete search history.

(56) References Cited

U.S. PATENT DOCUMENTS

| | | | | |
|---|---|---|---|---|
| 5,486,354 A * | 1/1996 | Defossez | ................. | A61K 8/29 424/61 |
| 5,922,118 A * | 7/1999 | Johnson | .................... | C09C 1/56 106/31.6 |
| 2005/0069512 A1* | 3/2005 | Roso | ........................ | A61K 8/06 424/70.13 |
| 2006/0217486 A1 | 9/2006 | Ohyama et al. | | |
| 2009/0075028 A1 | 3/2009 | Suzuki et al. | | |
| 2009/0081574 A1* | 3/2009 | Hasegawa | ............ | G03G 9/0912 430/108.21 |
| 2010/0183535 A1* | 7/2010 | Goetz | ...................... | A61K 8/19 424/64 |
| 2010/0330025 A1 | 12/2010 | Messersmith et al. | | |

FOREIGN PATENT DOCUMENTS

| | | |
|---|---|---|
| JP | 6-263830 | 9/1994 |
| JP | 11-189735 | 7/1999 |
| JP | 11-189736 | 7/1999 |
| JP | 2000-63698 | 2/2000 |
| JP | 2000-212468 | 8/2000 |
| JP | 2001-240766 | 9/2001 |
| JP | 2001-240767 | 9/2001 |
| JP | 2004-168898 | 6/2004 |
| JP | 2005-120223 | 5/2005 |
| JP | 2005-232249 | 9/2005 |
| JP | 2006-299239 | 11/2006 |
| JP | 2008-285632 | 11/2008 |
| JP | 2009-50807 | 3/2009 |
| JP | 2011-1536 | 1/2011 |
| WO | 2007/008199 | 1/2007 |
| WO | 2009/036790 | 3/2009 |

OTHER PUBLICATIONS

Catecholic Polymers for Surface-modification and Color Materials, Kohri et al, Journal of the Japan Society of Color Materials, vol. 87 (2014), No. 8, p. 279-283.*
Biomimetic non-iridescent structural color materials from polydopamine black particles that mimic melanin granules, Kohri et al, Journal of Materials Chemistry C, 2015, 3, 720-724.*
Forster et al., "Biomimetic Isotropic Nanostructures for Structural Coloration", Adv. Mater, vol. 22, Issue 26-27, 2010, pp. 2939-2944.
Lee et al., "Mussel-Inspired Surface Chemistry for Multifunctional Coatings", Science, vol. 318, Oct. 19, 2007, pp. 426-430.
Extended European Search Report dated Aug. 19, 2016 in corresponding European Application No. 16178007.7.

* cited by examiner

*Primary Examiner* — Tae H Yoon
(74) *Attorney, Agent, or Firm* — Wenderoth, Lind & Ponack, L.L.P.

(57) ABSTRACT

Provided is the so-called agent imparting the distinctness of image, namely, an additive for an aqueous coating material that can improve the distinctness of image of the coating film of any glossy aqueous coating material in order to prevent the white blurring phenomenon, which is caused by diffuse reflection of light, to a degree that could not be previously achieved, by increasing the dispersivity of a carbon black or an organic pigment in a coating material resin. Catecholic polymer black microparticles that exhibit an angle-independent structural color are used as the agent imparting the distinctness of image.

7 Claims, No Drawings

ADDITIVE FOR AQUEOUS COATING MATERIAL FOR IMPARTING DISTINCTNESS OF IMAGE TO COATING FILM

TECHNICAL FIELD

The present invention relates to an additive for an aqueous coating material including, as an effective component, catecholic polymer black microparticles for improving the distinctness of image of the finish coating film of an aqueous coating material, in particular, an aqueous coating material having a pigment dispersed therein, and also relates to an aqueous coating material composition including the additive.

BACKGROUND ART

In coating materials, pigments, which are solid materials, are most often stably dispersed in a solvent by using surfactants or the so-called pigment dispersants such as polymer compounds having a polar group. However, with coating films using black coating materials or dark-color coating films, when the actually coated film is dried, the so-called white blurring can occur, that is, the film can look whitish according to the angle and intensity of light. This phenomenon is particularly clearly observed in aqueous coating materials using water-based emulsion resins.

For example, in the case of black coating materials, a large number of techniques based on the increase in dispersivity of carbon black have been suggested as methods for preventing this phenomenon. PTL 1 to 3 suggest methods for improving the dispersivity of carbon black in coating material resins by using a dispersant. PTL 4 and 5 suggest methods for improving jet blackness by using a carbon black of excellent dispersivity which has been produced by a novel method. In PTL 6 to 10, jet blackness is improved by using a carbon black with stabilized dispersivity which has been produced by a method of polymerizing a vinyl polymer from the carbon black surface. Meanwhile, in coating materials which are also required to have excellent external appearance, as in coating materials for automobiles, better jet blackness and higher distinctness of image are achieved by improving the coating system in addition to increasing the dispersivity of carbon black or organic pigments, as suggested in PTL 11 to 14.

Further, NPL 1 suggests absorbing extra scattered light and obtaining high-saturation coloring by admixing a carbon black to a coating material for preventing light scattering from the coloring pigment surface.

CITATION LIST

Patent Literature

PTL 1: Japanese Patent Application Publication No. H11-189735
PTL 2: Japanese Patent Application Publication No. H11-189736
PTL 3: Japanese Patent Application Publication No. 2000-212468
PTL 4: Japanese Patent Application Publication No. 2004-168898
PTL 5: Japanese Patent Application Publication No. 2005-120223
PTL 6: Japanese Patent Application Publication No. 2000-63698
PTL 7: Japanese Patent Application Publication No. 2008-285632
PTL 8: Japanese Patent Application Publication No. 2001-240767
PTL 9: Japanese Patent Application Publication No. 2001-240766
PTL 10: Japanese Patent Application Publication No. H6-263830
PTL 11: Japanese Patent Application Publication No. 2005-232249
PTL 12: Japanese Patent Application Publication No. 2009-50807
PTL 13: Japanese Patent Application Publication No. 2006-299239
PTL 14: Japanese Patent Application Publication No. 2011-1536

Non-Patent Literature

NPL 1: D. Forster, H. Noh, S. F. Liew, V. Saranathan, C. F. Schreck, L. Yang, J. Park, R. O. Prum, S. G. J. Mochrie, C. S. O'Hern, H. Cao, E. R. Dufresne: Biomimetic Isotropic Nanostructures for Structural Coloration, Advanced Materials, Volume 22, Issue 26-27, 2010, pages 2939-2944

DISCLOSURE OF THE INVENTION

Problem to be Solved by the Invention

However, even when the dispersivity of carbon black or organic pigment is improved, the phenomenon of whitening in the coating film caused by diffuse reflection of light, which originates due to the coating material resin, that is, the so-called white blurring, cannot be entirely eliminated. In particular, in emulsion coating materials which are typical aqueous coating materials, when the emulsion particles coalesce to form a uniform coating film in the drying process, some of the particles undergo microphase separation and the diffuse reflection on the interfaces thereof causes white blurring. In coating materials constituted by a plurality of coating films, as in the case of automotive coating materials, high distinctness of image can be achieved by improving the coating method, but in the coating films coated with a brush or a roll, as in the case of woodworking coating material and construction coating materials, such an improvement is difficult to achieve. In PTL 11, the white blurring is prevented by using a dispersed composition of an organic pigment or a carbon black that has adsorbed colloidal particles with a size of 5 nm to 100 nm on the surface. However, cost considerations make it difficult to use special pigments or coating methods with general-use coating materials.

Further, where a carbon black is dispersed using a pigment dispersant, as described in the prior art literature, the carbon black surface is covered by the pigment dispersant and the scattered light absorption effect can be lost. Even when sufficient dispersion is realized over time, in particular, in an aqueous coating material, since the carbon black surface is hydrophobic, the carbon black aggregates in the added coating material, and a stable effect sometimes cannot be sufficiently exhibited.

Therefore, it is an objective of the present invention to provide a so-called agent imparting the distinctness of image which is an additive for a coating material that can improve the distinctness of image of a coating film formed by any glossy aqueous coating material in order to prevent the white blurring phenomenon, which is caused by diffuse reflection of light, to a degree that could not be previously achieved by improving the dispersivity of a carbon black or an organic pigment in a coating material resin.

Means for Solving the Problem

The results of the comprehensive study conducted by the inventors have demonstrated that the aforementioned objective can be attained by using special black microparticles as an additive, without using a modified carbon black or a special coating method such as described hereinabove. In Michinari Kohri, Yuri Nannichi: Catecholic Polymers for Surface-modification and Color Materials, Journal of the Japan Society of Colour Material, Vol. 87 (2014), No. 8, p. 279-283, or Michinari Kohri, Yuri Nannichi, Tatsuo Taniguchi and Keiki Kishikawa: Biomimetic non-iridescent structural color materials from polydopamine black particles that mimic melanin granules, Journal of Materials Chemistry C, 2015, 3, 720-724, it is reported that polydopamine black microparticles can develop an angle-independent structural color, those particles being melamine black microparticle (poly(L-dihydroxyphenylalanine)) analogues obtained by dopamine polymerization using an amino acid derivative as a starting material, this method mimicking the biosynthesis of melanin granules synthesized in a living body, such as peacock, and it is also reported that such microparticles are capable of absorbing scattered light from various directions. Further, since poly(3-(3,4-dihydroxyphenyl)-L-alanine) black microparticles obtained by polymerization of 3-(3,4-dihydroxyphenyl)-L-alanine have a structure similar to that of the polydopamine black microparticles, they apparently have similar properties.

Further, polydopamine black microparticles or poly(3-(3,4-dihydroxyphenyl)-L-alanine) black microparticles are capable of self-dispersing uniformly in water because they have a negative zeta potential on the surface thereof.

It was unexpectedly found that catecholic polymer black microparticles enclosing such black particles and having the aforementioned properties can demonstrate the aforementioned special quality also in aqueous coating materials, and even when added in a very small amount, they compare favorably with the carbon black disclosed in NPL 3 (or are significantly superior to the carbon black), which makes it possible to prevent light scattering from the pigment surface in the coating film of an aqueous coating material and achieve a high color contrast, thereby imparting the effect of preventing white blurring to the aqueous coating material regardless of the type of the pigment or resin particles contained in the aqueous coating material.

Therefore, the following aspects of the present invention are provided.

(1) An additive (agent imparting the distinctness of image) for an aqueous coating material for imparting the distinctness of image to a coating film of the aqueous coating material, the additive including, as an effective component, catecholic polymer black microparticles that exhibit an angle-independent structural color.

(2) An aqueous coating material composition including an aqueous coating material and catecholic polymer black microparticles that exhibit an angle-independent structural color, in an amount effective for imparting the distinctness of image to a coating film of the aqueous coating material.

(3) A method for manufacturing an aqueous coating material composition, including a process of adding, to an aqueous coating material, catecholic polymer black microparticles that exhibit an angle-independent structural color in an amount effective for imparting distinctness of image to a coating film.

(4) A use of catecholic polymer black microparticles that exhibit an angle-independent structural color for manufacturing an additive for an aqueous coating material for imparting the distinctness of image to a coating film of the aqueous coating material.

Effects of Invention

When added in a very small amount to an aqueous colored coating material in which a coloring pigment is dispersed, the agent imparting the distinctness of image according to the present invention exhibits an effect of preventing white blurring which is caused by diffuse reflection of light and observed in dry coating films after coating, in particular, coating films of dark colors.

DESCRIPTION OF EMBODIMENTS

Detailed Description of the Invention

The present invention will be described hereinbelow in detail. The technical terms used hereinbelow are assumed to have the meaning generally used in the pertinent technical field, unless specifically defined otherwise.

The catecholic polymer black microparticles mean black microparticles derived from a monomer having a pyrocatechol or 1,2-dihydroxybenzene skeleton and capable of forming microparticles of black color by polymerization. In the present invention, the black microparticles develop an angle-independent structural color. Thus, any polymerization mode can be used for forming the particles, provided that the structural color, more specifically, clear coloring defined by a microscopic structure equal to or less than the light wavelength, is developed independently of the angle of the incident light. Although there is no limitation on such black microparticles, suitable examples thereof include black microparticles derived from the aforementioned polydopamine, poly(3-(3,4-dihydroxyphenyl)-L-alanine), and poly(3-(3,4-dihydroxyphenyl)-2-methyl-L-alanine). Typical examples include black microparticles described in two reports by Michinari Kohri, et al., mentioned hereinabove, and black microparticles that can be obtained by the method for manufacturing black microparticles disclosed therein. Such catecholic polymer black microparticles can include auxiliary components, such as metals, in minor amounts such that do not adversely affect the expected operation effect of the present invention, for example, can include an oligomer or a monomer of the polymer. It is, however, preferred that the black microparticles be constituted by a catecholic polymer alone.

The present invention will be explained hereinbelow by considering black microparticles derived from polydopamine and poly(3-(3,4-dihydroxyphenyl)-L-alanine) as typical examples in order to simplify the explanation of the catecholic polymer black microparticles, but this explanation is also applicable to catecholic polymer black microparticles as a comprehensive concept.

Polydopamine black microparticles are uniformly dispersed in aqueous coating material systems due to a negative zeta potential that the polydopamine has in aqueous solvents, and the dispersed particles can absorb the diffusely-reflected scattered light, or cause the interference thereof. In order for such dopamine black microparticles to affect visible light, it is important to control the size of the black microparticles so that the black microparticles could be uniformly dispersed without interference with each other. Typically, where the size of the black microparticles is uniform (the granularity distribution is narrow), the expected operation and effect are exhibited without inhibiting the self-dispersibility in aqueous coating materials.

Further, in order to avoid affecting the color developing ability of pigments in aqueous coating materials, it is preferred that the size of the polydopamine black microparticles be as small as possible. However, a rather large particle size is needed to absorb the visible light efficiently. Therefore, the average particle size of polydopamine black microparticles can typically be 10 nm to 1000 nm, preferably 50 nm to 500 nm, and even more preferably 70 nm to 250 nm. Where the particle size is less than 10 nm, the visible light is easily transmitted and the effect of preventing the diffuse reflection of visible light is weakened. Where the particle size exceeds 1000 nm, the polymer microparticles are difficult to disperse uniformly.

Such particle size or the aforementioned granularity distribution can be checked by measurements on an aqueous sample including the black microparticles. As for the granularity distribution, it is preferred that the particle size be uniform, as mentioned hereinabove, but for smaller particle sizes, for example, when the d50 value is 10 nm to 250 nm, the standard deviation (SD) value can be about 100% or less, preferably 70% or less, and more preferably 50% or less with respect to the d50 value, and where the particle size exceeds 250 nm, the standard deviation is preferably 50% or less.

This explanation relating to the polydopamine black microparticles is equally applicable to poly(3-(3,4-dihydroxyphenyl)-L-alanine) black microparticles and catecholic polymer black microparticles including the same.

The polydopamine black microparticles according to the present invention are typically manufactured by the following process.

Random amounts of dopamine hydrochloride and tris (hydroxymethyl)aminomethane (Tris) are introduced into a water/methanol mixed solvent, water/ethanol mixed solvent, or water/isopropyl alcohol mixed solvent, stirring is performed for a predetermined time (for example, 24 h) at a predetermined temperature (for example, 50° C.), the alcohol is removed with an evaporator, and distilled water is used to adjust to the predetermined polydopamine microparticle concentration.

The particle size of the polydopamine black microparticles can be adjusted by changing the amount of the dopamine hydrochloride, which is a monomer, Tris concentration, and polymerization temperature. If necessary, an even finer particle size can be obtained by using triethylamine or diethylamine in combination with the tris(hydroxymethyl)aminomethane.

When 3-(3,4-dihydroxyphenyl)-L-alanine is used as the monomer, the size of poly(3-(3,4-dihydroxyphenyl)-L-alanine) black microparticles can be also adjusted by the above-described procedure.

The additive according to the present invention may be used alone in the form of microparticles having the catecholic polymer black microparticles as an effective component, or in the form of a mixture including the microparticles and a diluting agent or a carrier which does not adversely affect the action of the microparticles.

In the present invention, the aqueous coating material means a coating material dilutable with water. Where such an aqueous coating material includes a hydrophobic resin as a binder, it is in the form of aqueous emulsion, aqueous dispersion, aqueous slurry, or a composite form thereof, but those forms are not limiting. It is particularly preferred that the aqueous coating material which is used in accordance with the present invention be an emulsion coating material, although the specific form thereof is not limited as long as the objective of the present invention can be attained. An emulsion coating material generally means a coating material using as a vehicle a suspension obtained by dispersing a water-insoluble resin, drying oil, or varnish in water. An emulsion coating material having as a vehicle a polymer (synthetic latex) manufactured by emulsion polymerization is more preferred.

A coating material which is such an aqueous coating material and suitable for imparting the distinctness of image to the coating film is a glossy aqueous material. The glossy aqueous coating material is not particularly limited and, for example, can be a high gloss aqueous construction coating material, a color aqueous base coating material for automobiles, and an aqueous coating material for high-end household appliances. Examples of pigments to be included in the glossy aqueous coating material include organic pigments such as azo yellow pigments, isoindolinone yellow pigments, azo red pigments, quinacridone red pigments, phthalocyanine blue pigments, and threne blue pigments, and inorganic pigments such as carbon black, titanium white, titanium yellow, cobalt blue, and ultramarine blue.

In accordance with the present invention, the while blurring phenomenon caused by diffuse light reflection which is observed in the so-called finish coating film formed by coating the aqueous coating material including catecholic polymer black microparticles on a surface to be coated and then drying is suppressed as compared with aqueous coating materials including no such microparticles. In the present invention, the change or modification of the aqueous coating material that results in the demonstration of such an operation effect is referred to as "imparting distinctness of image to the coating film of the aqueous coating material" or "imparting distinctness of image". The distinctness of image, which is also called image clarity, is the ability of a coated surface to represent other objects as a mirror. The smaller is the blurring or distortion of the image, the higher is the distinctness of image. The black microparticles are particularly suitable for improving the deep-color coating materials in which white blurring of the coating film is seen. Therefore, the effective component, as referred to in the present invention, means a basic component that can improve the distinctness of image of the finish coating film of an aqueous coating material, and the effective amount of the black microparticles is the amount necessary for imparting the abovementioned distinctness of image to the coating film of an aqueous coating material.

The effective amount differs depending on the compounded composition of the pigment or the type of the resin included in the aqueous coating material, but is usually 0.0001% by weight to 0.1% by weight, preferably 0.001% by weight to 0.1% by weight, and more preferably 0.01% by weight to 0.1% by weight, when calculated as solids, with respect to the coating material vehicle. With consideration for the cost-effect balance, this amount is 0.0001% by weight to 0.01% by weight, and preferably 0.001% by weight to 0.01% by weight.

Where the amount used is less than 0.0001% by weight, a sufficient effect of imparting the distinctness of image cannot be obtained. In contrast, adding in an amount of more than 0.1% by weight is meaningless because the effect of imparting the distinctness of image does not change.

When the aqueous coating material composition in accordance with the present invention is manufactured, the catecholic polymer black microparticles which are the agent imparting the distinctness of image can be added to the aqueous coating material at any time, that is, in the process of mixing the pigment or after the coating material is manufactured. This addition process can be implemented using a well-known device or means that is used in the manufacture or preparation of coating materials.

EXAMPLES

The present invention will be explained hereinbelow in greater detail by examples thereof. However, the present invention is not intended to be limited to those examples.

Hereinbelow, "parts" and "%" mean "parts by weight" and "% by weight", respectively.

Preparation Example 1

Distilled water (350 g), methanol (100 g), and tris(hydroxymethyl)aminomethane (60.5 g) were introduced in a 1000-ml reaction vessel equipped with a stirrer, a reflux cooler, a thermometer, and a nitrogen gas blowing port, and the vessel was sufficiently purged with the nitrogen gas. Stirring was then started and temperature rose to 50° C. A solution prepared in advance by dissolving dopamine hydrochloride (1 g) in distilled water (50 g) was then slowly added to the reaction vessel. The reaction was stopped after 24 h, and after cooling to room temperature, the reaction liquid was taken out and methanol was removed with a rotary evaporator. A test sample (A-1) to be used in the below-described coating material test was produced by diluting the obtained liquid including dopamine black microparticles with distilled water to the microparticle concentration of 0.2%.

The granularity of the test sample was measured with a particle size—granularity distribution measuring device of a dynamic light scattering system (Microtrac, manufactured by NIKKISO CO., LTD.) (referred to hereinbelow as granularity analyzer). The measurement results were: median diameter (d50)=191 nm and standard deviation (SD)=36 nm.

Preparation Example 2

Distilled water (350 g), methanol (100 g), and tris(hydroxymethyl)aminomethane (121 g) were introduced in a 1000-ml reaction vessel equipped with a stirrer, a reflux cooler, a thermometer, and a nitrogen gas blowing port, and the vessel was sufficiently purged with the nitrogen gas. Stirring was then started and temperature rose to 50° C. A solution prepared in advance by dissolving dopamine hydrochloride (1 g) in distilled water (50 g) was then slowly added to the reaction vessel. The reaction was stopped after 24 h, and after cooling to room temperature, the reaction liquid was taken out and methanol was removed with a rotary evaporator. A test sample (A-2) to be used in the below-described coating material test was produced by diluting the obtained liquid including dopamine black microparticles with distilled water to the microparticle concentration of 0.2%.

The granularity of the test sample was measured using the granularity analyzer. The measurement results were: median diameter (d50)=98 nm and standard deviation (SD)=24 nm.

Preparation Example 3

Distilled water (350 g), methanol (100 g), and tris(hydroxymethyl)aminomethane (30.25 g) were introduced in a 1000-ml reaction vessel equipped with a stirrer, a reflux cooler, a thermometer, and a nitrogen gas blowing port, and the vessel was sufficiently purged with the nitrogen gas. Stirring was then started and temperature rose to 50° C. A solution prepared in advance by dissolving dopamine hydrochloride (1 g) in distilled water (50 g) was then slowly added to the reaction vessel. The reaction was stopped after 24 h, and after cooling to room temperature, the reaction liquid was taken out and methanol was removed with a rotary evaporator. A test sample (A-3) to be used in the below-described coating material test was produced by diluting the obtained liquid including dopamine black microparticles with distilled water to the microparticle concentration of 0.2%.

The granularity of the test sample was measured using the granularity analyzer. The measurement results were: median diameter (d50)=298 nm and standard deviation (SD)=147 nm.

Preparation Example 4

Distilled water (350 g), methanol (100 g), and tris(hydroxymethyl)aminomethane (60.5 g) were introduced in a 1000-ml reaction vessel equipped with a stirrer, a reflux cooler, a thermometer, and a nitrogen gas blowing port, and the vessel was sufficiently purged with the nitrogen gas. Stirring was then started and temperature rose to 50° C. A solution prepared in advance by dissolving dopamine hydrochloride (2 g) in distilled water (50 g) was then slowly added to the reaction vessel. The reaction was stopped after 24 h, and after cooling to room temperature, the reaction liquid was taken out and methanol was removed with a rotary evaporator. A test sample (A-4) to be used in the below-described coating material test was produced by diluting the obtained liquid including dopamine black microparticles with distilled water to the microparticle concentration of 0.2%.

The granularity of the test sample was measured using the granularity analyzer. The measurement results were: median diameter (d50)=424 nm and standard deviation (SD)=159 nm.

Preparation Example 5

Distilled water (350 g), ethanol (100 g), and tris(hydroxymethyl)aminomethane (60.5 g) were introduced in a 1000-ml reaction vessel equipped with a stirrer, a reflux cooler, a thermometer, and a nitrogen gas blowing port, and the vessel was sufficiently purged with the nitrogen gas. Stirring was then started and temperature rose to 50° C. A solution prepared in advance by dissolving dopamine hydrochloride (5 g) in distilled water (50 g) was then slowly added to the reaction vessel. The reaction was stopped after 24 h, and after cooling to room temperature, the reaction liquid was taken out and ethanol was removed with a rotary evaporator. A test sample (A-5) to be used in the below-described coating material test was produced by diluting the obtained liquid including dopamine black microparticles with distilled water to the microparticle concentration of 0.2%.

The granularity of the test sample was measured using the granularity analyzer. The measurement results were: median diameter (d50)=896 nm and standard deviation (SD)=417 nm.

Preparation Example 6

Distilled water (350 g), ethanol (100 g), tris(hydroxymethyl)aminomethane (60.5 g), and triethylamine (50.5 g)

were introduced in a 1000-ml reaction vessel equipped with a stirrer, a reflux cooler, a thermometer, and a nitrogen gas blowing port, and the vessel was sufficiently purged with the nitrogen gas. Stirring was then started and temperature rose to 50° C. A solution prepared in advance by dissolving dopamine hydrochloride (5 g) in distilled water (50 g) was then slowly added to the reaction vessel. The reaction was stopped after 24 h, and after cooling to room temperature, the reaction liquid was taken out and ethanol and triethylamine were removed with a rotary evaporator. A test sample (A-6) to be used in the below-described coating material test was produced by diluting the obtained liquid including dopamine black microparticles with distilled water to the microparticle concentration of 0.2%.

The granularity of the test sample was measured using the granularity analyzer. The measurement results were: median diameter (d50)=139 nm and standard deviation (SD)=76 nm.

Preparation Example 7

Distilled water (400 g), methanol (50 g), and tris(hydroxymethyl)aminomethane (121 g) were introduced in a 1000-ml reaction vessel equipped with a stirrer, a reflux cooler, a thermometer, and a nitrogen gas blowing port, and the vessel was sufficiently purged with the nitrogen gas. Stirring was then started and temperature rose to 50° C. A solution prepared in advance by dissolving dopamine hydrochloride (2 g) in distilled water (50 g) was then slowly added to the reaction vessel. The reaction was stopped after 24 h, and after cooling to room temperature, the reaction liquid was taken out and methanol was removed with a rotary evaporator. A test sample (A-7) to be used in the below-described coating material test was produced by diluting the obtained liquid including dopamine black microparticles with distilled water to the microparticle concentration of 0.2%.

The granularity of the test sample was measured using the granularity analyzer. The measurement results were: median diameter (d50)=79 nm and standard deviation (SD)=73 nm.

Preparation Example 8

Distilled water (400 g), ethanol (50 g), and tris(hydroxymethyl)aminomethane (12.1 g) were introduced in a 1000-ml reaction vessel equipped with a stirrer, a reflux cooler, a thermometer, and a nitrogen gas blowing port, and the vessel was sufficiently purged with the nitrogen gas. Stirring was then started and temperature rose to 50° C. A solution prepared in advance by dissolving dopamine hydrochloride (5 g) in distilled water (50 g) was then slowly added to the reaction vessel. The reaction was stopped after 24 h, and after cooling to room temperature, the reaction liquid was taken out and ethanol was removed with a rotary evaporator. A test sample (A-8) to be used in the below-described coating material test was produced by diluting the obtained liquid including dopamine black microparticles with distilled water to the microparticle concentration of 0.2%.

The granularity of the test sample was measured using the granularity analyzer. The measurement results were: median diameter (d50)=918 nm and standard deviation (SD)=638 nm.

Preparation Example 9

Distilled water (350 g), 2-propanol (100 g), tris(hydroxymethyl)aminomethane (12.1 g), and diethylamine (15.1 g) were introduced in a 1000-ml reaction vessel equipped with a stirrer, a reflux cooler, a thermometer, and a nitrogen gas blowing port, and the vessel was sufficiently purged with the nitrogen gas. Stirring was then started and temperature rose to 50° C. A solution prepared in advance by dissolving dopamine hydrochloride (1 g) in distilled water (50 g) was then slowly added to the reaction vessel. The reaction was stopped after 24 h, and after cooling to room temperature, the reaction liquid was taken out and 2-propanol and diethylamine were removed with a rotary evaporator. A test sample (A-9) to be used in the below-described coating material test was produced by diluting the obtained liquid including dopamine black microparticles with distilled water to the microparticle concentration of 0.2%.

The granularity of the test sample was measured using the granularity analyzer. The measurement results were: median diameter (d50)=373 nm and standard deviation (SD)=179 nm.

Preparation Example 10

Distilled water (300 g), 3-(3,4-dihydroxyphenyl)-L-alanine (L-doper) (2 g), and ethanol (100 g) were introduced in a 1000-ml reaction vessel equipped with a stirrer, a reflux cooler, a thermometer, and a nitrogen gas blowing port, and the vessel was sufficiently purged with the nitrogen gas. Stirring was then started and temperature rose to 50° C. A solution prepared in advance by dissolving tris(hydroxymethyl)aminomethane (60.5 g) in distilled water (100 g) was then slowly added to the reaction vessel. The reaction was stopped after 24 h, and after cooling to room temperature, the reaction liquid was taken out and ethanol was removed with a rotary evaporator. A test sample (A-10) to be used in the below-described coating material test was produced by diluting the obtained liquid including L-doper black microparticles with distilled water to the microparticle concentration of 0.2%.

The granularity of the test sample was measured using the granularity analyzer. The measurement results were: median diameter (d50)=360 nm and standard deviation (SD)=173 nm.

Preparation Example 11

Distilled water (300 g), 3-(3,4-dihydroxyphenyl)-L-alanine (L-doper) (2 g), ethanol (100 g), and triethylamine (10.1 g) were introduced in a 1000-ml reaction vessel equipped with a stirrer, a reflux cooler, a thermometer, and a nitrogen gas blowing port, and the vessel was sufficiently purged with the nitrogen gas. Stirring was then started and temperature rose to 50° C. A solution prepared in advance by dissolving tris(hydroxymethyl)aminomethane (12.1 g) in distilled water (100 g) was then slowly added to the reaction vessel. The reaction was stopped after 24 h, and after cooling to room temperature, the reaction liquid was taken out and ethanol and triethylamine were removed with a rotary evaporator. A test sample (A-11) to be used in the below-described coating material test was produced by diluting the obtained liquid including L-doper black microparticles with distilled water to the microparticle concentration of 0.2%.

The granularity of the test sample was measured using the granularity analyzer. The measurement results were: median diameter (d50)=198 nm and standard deviation (SD)=77 nm.

Comparative Preparation Example 1

Distilled water (50 g), methanol (400 g), and tris(hydroxymethyl)aminomethane (60.5 g) were introduced in a 1000-ml reaction vessel equipped with a stirrer, a reflux cooler, a thermometer, and a nitrogen gas blowing port, and the vessel was sufficiently purged with the nitrogen gas. Stirring was then started and temperature rose to 50° C. A solution prepared in advance by dissolving dopamine hydrochloride (2 g) in distilled water (50 g) was then slowly added to the reaction vessel. The reaction was stopped after 24 h, and after cooling to room temperature, the reaction liquid was taken out and methanol was removed with a rotary evaporator. A test sample (B-1) to be used in the below-described coating material test was produced by diluting the obtained liquid including dopamine black microparticles with distilled water to the microparticle concentration of 0.2%.

The granularity of the test sample was measured using the granularity analyzer. The measurement results were: median diameter (d50)=2367 nm and standard deviation (SD)=590 nm.

Comparative Preparation Example 2

Distilled water (200 g), methanol (250 g), and tris(hydroxymethyl)aminomethane (12.1 g) were introduced in a 1000-ml reaction vessel equipped with a stirrer, a reflux cooler, a thermometer, and a nitrogen gas blowing port, and the vessel was sufficiently purged with the nitrogen gas. Stirring was then started and temperature rose to 50° C. A solution prepared in advance by dissolving dopamine hydrochloride (5 g) in distilled water (50 g) was then slowly added to the reaction vessel. The reaction was stopped after 24 h, and after cooling to room temperature, the reaction liquid was taken out and methanol was removed with a rotary evaporator. A test sample (B-2) to be used in the below-described coating material test was produced by diluting the obtained liquid including dopamine black microparticles with distilled water to the microparticle concentration of 0.2%.

The granularity of the test sample was measured using the granularity analyzer. The measurement results were: median diameter (d50)=3008 nm and standard deviation (SD)=1793 nm.

Comparative Preparation Example 3

Distilled water (200 g), propylene glycol monomethyl ether (250 g), and tris(hydroxymethyl)aminomethane (60.5 g) were introduced in a 1000-ml reaction vessel equipped with a stirrer, a reflux cooler, a thermometer, and a nitrogen gas blowing port, and the vessel was sufficiently purged with the nitrogen gas. Stirring was then started and temperature rose to 60° C. A solution prepared in advance by dissolving dopamine hydrochloride (5 g) in distilled water (50 g) was then slowly added to the reaction vessel. The reaction was stopped after 24 h, and after cooling to room temperature, the reaction liquid was taken out. A test sample (B-3) to be used in the below-described coating material test was produced by diluting the obtained liquid including dopamine black microparticles with distilled water to the microparticle concentration of 0.2%.

The granularity of the test sample was measured using the granularity analyzer. The measurement results were: median diameter (d50)=1699 nm and standard deviation (SD)=1255 nm.

Comparative Preparation Example 4

Distilled water (350 g), ethanol (100 g), tris(hydroxymethyl)aminomethane (15.1 g), and triethylamine (12.6 g) were introduced in a 1000-ml reaction vessel equipped with a stirrer, a reflux cooler, a thermometer, and a nitrogen gas blowing port, and the vessel was sufficiently purged with the nitrogen gas. Stirring was then started and temperature rose to 50° C. A solution prepared in advance by dissolving dopamine hydrochloride (2 g) in distilled water (50 g) was then slowly added to the reaction vessel. The reaction was stopped after 24 h, and after cooling to room temperature, the reaction liquid was taken out and ethanol and triethylamine were removed with a rotary evaporator. A test sample (B-4) to be used in the below-described coating material test was produced by diluting the obtained liquid including dopamine black microparticles with distilled water to the microparticle concentration of 0.2%.

The granularity of the test sample was measured using the granularity analyzer. The measurement results were: median diameter (d50)=6.6 nm and standard deviation (SD)=0.9 nm.

Comparative Preparation Example 5

Distilled water (300 g), 3-(3,4-dihydroxyphenyl)-L-alanine (L-doper) (2 g), and ethanol (100 g) were introduced in a 1000-ml reaction vessel equipped with a stirrer, a reflux cooler, a thermometer, and a nitrogen gas blowing port, and the vessel was sufficiently purged with the nitrogen gas. Stirring was then started and temperature rose to 50° C. A solution prepared in advance by dissolving tris(hydroxymethyl)aminomethane (6.1 g) in distilled water (100 g) was then slowly added to the reaction vessel. The reaction was stopped after 24 h, and after cooling to room temperature, the reaction liquid was taken out and ethanol was removed with a rotary evaporator. A test sample (B-5) to be used in the below-described coating material test was produced by diluting the obtained liquid including L-doper black microparticles with distilled water to the microparticle concentration of 0.2%.

The granularity of the test sample was measured using the granularity analyzer. The measurement results were: median diameter (d50)=1325 nm and standard deviation (SD)=759 nm.

Comparative Preparation Example 6

Carbon black microparticles FW-200 (10 g), AQ-1703N (pigment dispersant for carbon black: manufactured by Kusumoto Chemicals, Ltd.) (15 g), and deionized water (90 g) were loaded in a mayonnaise bottle and mixed with a laboratory disperser. An appropriate amount of glass beads (bead size 0.5 mm) was charged into the mixture, and a dispersion was produced by dispersing for 4 h with a paint shaker. A test sample (B-6) to be used in the below-described coating material test was produced by diluting the dispersion with deionized water to a concentration of 0.1%.

The granularity of the black microparticles in all of the test samples is shown in Table 1 (preparation examples) and Table 2 (comparative preparation examples) below.

TABLE 1

Black microparticles of preparation examples

|  | Test sample | Median diameter (d50) (nm) | Standard deviation (SD) (nm) |
|---|---|---|---|
| Preparation example 1 | A-1 | 191 | 36 |
| Preparation example 2 | A-2 | 98 | 24 |
| Preparation example 3 | A-3 | 298 | 147 |

TABLE 1-continued

Black microparticles of preparation examples

|  | Test sample | Median diameter (d50) (nm) | Standard deviation (SD) (nm) |
|---|---|---|---|
| Preparation example 4 | A-4 | 424 | 159 |
| Preparation example 5 | A-5 | 896 | 417 |
| Preparation example 6 | A-6 | 139 | 76 |
| Preparation example 7 | A-7 | 79 | 73 |
| Preparation example 8 | A-8 | 918 | 638 |
| Preparation example 9 | A-9 | 373 | 179 |
| Preparation example 10 | A-10 | 360 | 173 |
| Preparation example 11 | A-11 | 198 | 77 |

TABLE 2

Black microparticles of comparative preparation examples

|  | Test sample | Median diameter (d50) (nm) | Standard deviation (SD) (nm) |
|---|---|---|---|
| Comparative preparation example 1 | B-5 | 2367 | 590 |
| Comparative preparation example 2 | B-2 | 3008 | 1793 |
| Comparative preparation example 3 | B-3 | 1699 | 1255 |
| Comparative preparation example 4 | B-4 | 6.6 | 0.9 |
| Comparative preparation example 5 | B-5 | 1325 | 759 |
| Comparative preparation example 6 | B-6 | 1110 | 1860 |

Coating Material Test Example

Evaluation of distinctness of image of a coating film was performed by adding each of the above-described test samples to a commercial aqueous glossy black coating material (Aqueous Glossy EXE: manufactured by NIPPON-PAINT Co., Ltd.) and a green coating material (Super Outdoor: manufactured by Asahipen Corporation).

[Addition of Black Microparticles]

The test samples (agents imparting the distinctness of image) presented in Table 1 and Table 2 were added to each of the black and green aqueous glossy coating materials such that the solid fraction of the black microparticles was 01% by weight, 0.01% by weight, 0.001% by weight, and 0.0001% by weight with respect to the vehicle of the aqueous coating material, and stirring was performed for 2 min at 2000 rpm with a laboratory disperser. The dispersions were allowed to stay for 1 day, and then a coating test was performed with respect to the obtained black aqueous coating material and green aqueous coating material.

[Production and Evaluation of Coating Films of Test Coating Materials]

Each test coating material was applied with a 100-μm applicator to a glass plate and dried for 24 h at room temperature. The distinctness of image of each coating film was then visually evaluated. Thus, the degree to which the white blurring feel of the coating films was improved was evaluated by five stages from "the improvement effect at the highest level is confirmed" (5) to "the improvement effect is not confirmed" (1) by visual observations under sunlight and under illumination with a bright luminescent lamp. The evaluation results are presented in Table 3 (black coating material) and Table 4 (green coating material).

TABLE 3

Test results for aqueous glossy black coating material

| Test sample | Added amount of solid fraction (%) | | | |
|---|---|---|---|---|
|  | 0.1 | 0.01 | 0.001 | 0.0001 |
| A-1 | 4 | 5 | 4 | 2 |
| A-2 | 5 | 5 | 5 | 3 |
| A-3 | 4 | 4 | 3 | 2 |
| A-4 | 4 | 4 | 3 | 1 |
| A-5 | 4 | 3 | 1 | 1 |
| A-6 | 5 | 5 | 4 | 3 |
| A-7 | 5 | 5 | 5 | 4 |
| A-8 | 3 | 3 | 2 | 1 |
| A-9 | 4 | 5 | 4 | 3 |
| A-10 | 4 | 5 | 4 | 3 |
| A-11 | 5 | 5 | 5 | 3 |
| B-1 | 1 | 1 | 1 | 1 |
| B-2 | 1 | 1 | 1 | 1 |
| B-3 | 1 | 1 | 1 | 1 |
| B-4 | 2 | 2 | 1 | 1 |
| B-5 | 1 | 1 | 1 | 1 |
| B-6 | 1 | 1 | 1 | 1 |

Evaluation point 1: observation results are the same (the improvement effect is not confirmed) as for a blank coating material (the agent for imparting the distinctness of image is not added).
Evaluation point 2: improvement is observed under sunlight.
Evaluation point 3: improvement is observed under sunlight and under luminescent lamp.
Evaluation point 4: clear improvement is observed regardless of observation angle.
Evaluation point 5: complete elimination of white blurring is observed (the improvement effect at the highest level is confirmed).

TABLE 4

Test results for green aqueous coating material for outdoors

| Test sample | Added amount of solid fraction (%) | | | |
|---|---|---|---|---|
|  | 0.1 | 0.01 | 0.001 | 0.0001 |
| A-1 | 5 | 5 | 3 | 2 |
| A-2 | 5 | 5 | 4 | 3 |
| A-3 | 4 | 5 | 3 | 2 |
| A-4 | 5 | 4 | 3 | 1 |
| A-5 | 5 | 3 | 2 | 1 |
| A-6 | 5 | 5 | 4 | 2 |
| A-7 | 5 | 5 | 4 | 3 |
| A-8 | 4 | 3 | 2 | 1 |
| A-9 | 5 | 5 | 3 | 2 |
| A-10 | 5 | 4 | 3 | 2 |
| A-11 | 5 | 5 | 4 | 3 |
| B-1 | 2 | 1 | 1 | 1 |
| B-2 | 1 | 1 | 1 | 1 |
| B-3 | 2 | 1 | 1 | 1 |
| B-4 | 1 | 1 | 1 | 1 |
| B-5 | 2 | 1 | 1 | 1 |
| B-6 | 1 | 1 | 1 | 1 |

Evaluation point 1: observation results are the same (the improvement effect is not confirmed) as for a blank coating material (the agent for imparting the distinctness of image is not added).
Evaluation point 2: improvement is observed under sunlight.
Evaluation point 3: improvement is observed under sunlight and under luminescent lamp.
Evaluation point 4: clear improvement is observed regardless of observation angle.

Evaluation point 5: complete elimination of white blurring is observed (the improvement effect at the highest level is confirmed).

As demonstrated by the above-described examples, it is clear that the catecholic polymer black microparticles that mimic black melamine in accordance with the present invention are capable of imparting a significant distinctness of image to coating films (the white blurring feel of coating films is improved) even when added in a very small amount of about 0.001% by weight.

The present invention is described hereinabove and also explained by the specific examples, but it would be obvious to a person skilled in the art that the present invention can be also implemented in forms other than those described herein. Therefore, a large number of modified forms of the present invention should all be understood as being included in the appended claims.

INDUSTRIAL APPLICABILITY

The additive according to the present invention exhibits an effect of preventing the white blurring, which is caused by diffuse reflection of light in a dry coating film after coating (imparts the distinctness of image to the coating film), when added in a very small amount to an aqueous coating material in which a coloring pigment has been dispersed. Therefore, the additive can be advantageously utilized in production of coating materials.

The invention claimed is:

1. A glossy aqueous coating composition for forming a colored coating film having distinctness of image, comprising a glossy aqueous coating material which has been colored with a pigment, and
    catecholic polymer black microparticles that exhibit an angle-independent structural color in a proportion of from 0.001% by weight to 0.1% by weight on the basis of a vehicle of the glossy aqueous coating material,
    wherein the catecholic polymer black microparticles have an average particle size (or median diameter (d50)) of 10 nm to 500 nm.

2. The glossy aqueous coating material composition according to claim 1, wherein the catecholic polymer black microparticles are black microparticles derived from polydopamine.

3. The glossy aqueous coating material composition according to claim 1, wherein the catecholic polymer black microparticles are black microparticles derived from poly (3-(3,4-dihydroxyphenyl)-L-alanine).

4. A method for manufacturing a glossy aqueous coating material composition for forming a colored coating film having distinctness of image, comprising a process of adding, to a glossy aqueous coating material which has been colored with a pigment, catecholic polymer black microparticles that exhibit an angle-independent structural color in a proportion of from 0.001% by weight to 0.1% by weight on the basis of a vehicle of the glossy aqueous coating material,
    wherein the catecholic polymer black microparticles have an average particle size (or median diameter (d50)) of 10 nm to 500 nm.

5. The glossy aqueous coating material composition according to claim 1, wherein a standard deviation (SD) of the average particle size of the catecholic polymer black microparticles is 100% or less when d50 is 10 nm to 250 nm, and 50% or less when d50 exceeds 250 nm.

6. The glossy aqueous coating material composition according to claim 1, wherein the catecholic polymer black microparticles have an average particle size (or median diameter (d50)) of 50 nm to 500 nm.

7. The glossy aqueous coating material composition according to claim 1, wherein the aqueous coating material is selected from the group consisting of a glossy aqueous construction coating material, a glossy color aqueous base coating material for automobiles, and a glossy aqueous coating material for household appliances.

* * * * *